(12) United States Patent
Lee et al.

(10) Patent No.: US 10,699,753 B2
(45) Date of Patent: Jun. 30, 2020

(54) STOP MEMBER PROXIMATE TO FORMED-IN-PLACE GASKET OF A DRIVE ENCLOSURE COVER

(71) Applicant: Seagate Technology LLC, Cupertino, CA (US)

(72) Inventors: Chuen Buan Lee, Singapore (SG); Jiho Hwang, Singapore (SG); Pow Ming Yap, Singapore (SG); Kim Tai Chin, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/161,622

(22) Filed: Oct. 16, 2018

(65) Prior Publication Data
US 2020/0118601 A1 Apr. 16, 2020

(51) Int. Cl.
*G11B 33/14* (2006.01)
*G11B 25/04* (2006.01)

(52) U.S. Cl.
CPC ........ *G11B 33/1466* (2013.01); *G11B 25/043* (2013.01)

(58) Field of Classification Search
CPC .................................................. G11B 33/1466
USPC ....................................................... 360/99.22
See application file for complete search history.

(56) References Cited

U.S. PATENT DOCUMENTS

| | | | |
|---|---|---|---|
| 5,223,996 A | 6/1993 | Read et al. | |
| 5,422,766 A * | 6/1995 | Hack | G11B 33/1466 360/99.18 |
| 6,185,807 B1 * | 2/2001 | Kazmierczak | G11B 33/121 220/320 |
| 6,631,049 B2 * | 10/2003 | Satoh | G11B 25/043 277/632 |
| 7,372,662 B2 * | 5/2008 | Xu | G11B 25/043 360/264.8 |
| 7,389,992 B2 * | 6/2008 | Isono | F16J 15/025 277/637 |
| 7,436,653 B2 * | 10/2008 | Yang | H04M 1/0202 361/679.01 |
| 7,852,601 B1 * | 12/2010 | Little | G11B 33/1466 360/99.22 |
| 8,248,724 B2 | 8/2012 | Hayakawa et al. | |
| 9,190,116 B2 * | 11/2015 | Freeman | G11B 33/1466 |
| 9,281,659 B1 | 3/2016 | Tatah et al. | |
| 10,229,720 B2 * | 3/2019 | Nagata | G11B 33/1466 |
| 2002/0044376 A1 * | 4/2002 | Serizawa | G11B 25/043 360/99.22 |
| 2002/0089791 A1 * | 7/2002 | Morley | G11B 5/4833 360/245.9 |
| 2005/0036233 A1 * | 2/2005 | Xu | G11B 25/043 360/97.19 |
| 2005/0184463 A1 * | 8/2005 | Boutaghou | G11B 33/1466 277/316 |

(Continued)

*Primary Examiner* — Jefferson A Evans
(74) *Attorney, Agent, or Firm* — Mueting Raasch Group

(57) ABSTRACT

A disk drive enclosure includes a cover having a peripheral shape conforming to that of a base of the disk drive enclosure. A formed-in-place gasket is on an inner surface of the cover and corresponds to a shape of a mating edge of the base. The formed-in-place gasket forms a seal between the cover and the mating edge of the base. A stop member is located along an inner periphery of the formed-place-gasket and in immediate proximity to the formed-in-place gasket.

18 Claims, 5 Drawing Sheets

(56) References Cited

U.S. PATENT DOCUMENTS

| | | | | |
|---|---|---|---|---|
| 2005/0253343 A1* | 11/2005 | Hampton | ............... | F16J 15/062 |
| | | | | 277/628 |
| 2006/0291095 A1* | 12/2006 | Inoue | ................... | G11B 17/038 |
| | | | | 360/99.2 |
| 2008/0150240 A1* | 6/2008 | Isono | ..................... | F16J 15/025 |
| | | | | 277/650 |
| 2008/0316640 A1* | 12/2008 | Chan | ..................... | G11B 25/043 |
| | | | | 360/97.14 |
| 2009/0112299 A1* | 4/2009 | Chapman | ................ | A61F 7/007 |
| | | | | 607/109 |
| 2010/0232059 A1* | 9/2010 | Choi | .................. | G11B 33/1466 |
| | | | | 360/97.12 |
| 2012/0275287 A1 | 11/2012 | McGuire, Jr. et al. | | |
| 2013/0155546 A1* | 6/2013 | Heo | ..................... | G11B 25/043 |
| | | | | 360/97.19 |
| 2014/0368948 A1* | 12/2014 | Okutani | ............... | G11B 25/043 |
| | | | | 360/97.12 |

* cited by examiner

Section 5-5

STOP MEMBER PROXIMATE TO FORMED-IN-PLACE GASKET OF A DRIVE ENCLOSURE COVER

SUMMARY

The present disclosure is directed to a stop member proximate to a formed-in-place gasket of a drive enclosure cover. In one embodiment, a disk drive enclosure includes a cover having a peripheral shape conforming to that of a base of the disk drive enclosure. A formed-in-place gasket is on an inner surface of the cover and corresponds to a shape of a mating edge of the base. The formed-in-place gasket forms a seal between the cover and the mating edge of the base. A stop member is located along an inner periphery of the formed-place-gasket and in immediate proximity to the formed-in-place gasket.

In another embodiment, a method involves forming a formed-in-place gasket on an inner surface of a cover having a peripheral shape conforming to a base of a disk drive enclosure. The formed-in-place gasket corresponds to a shape of a mating edge of the base. A stop member is formed along an inner periphery of the formed-place-gasket and in immediate proximity to the formed-in-place gasket. The cover is installed onto the base, causing the formed-in-place gasket to form a seal between the cover and the mating edge of the base. The stop member prevents horizontal deflection of the formed-in-place gasket due to misalignment between the formed-in-place gasket and the mating edge.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
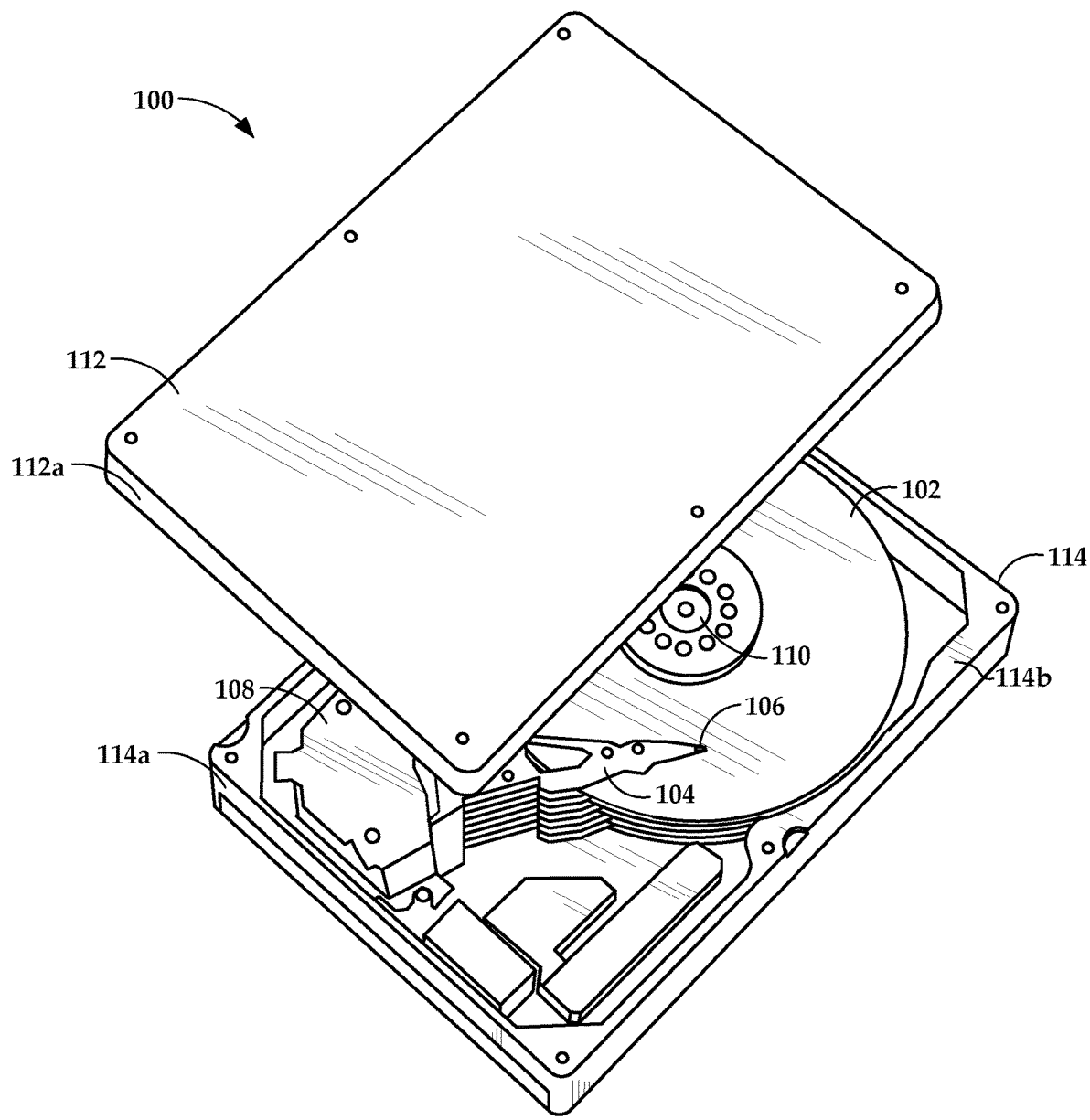
FIG. 1 is a perspective view of a drive according to an example embodiment.

The present disclosure generally relates to data storage devices that utilize magnetic storage media, e.g., disks. Data storage devices described herein may use a particular type of magnetic data storage known heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the superparamagnetic effect.

A HAMR device uses a near-field transducer to concentrate optical energy into the optical spot in a recording layer. The hotspot raises the media temperature locally, reducing the writing magnetic field required for high-density recording. A waveguide integrated into a read/write head can be used to deliver light to the near-field transducer. Light from a light source, such as an edge-emitting laser diode mounted to an outside surface of the read/write head, is coupled into the waveguide through waveguide input coupler or a spot size converter.

In a HAMR drive, there may be a need to seal the drive to prevent moisture from entering the enclosure. For example, it has been found that moisture inside the enclosure can result in degradation of the head performance, e.g., due to oxidation. The amount of moisture entering the hard drive enclosure can be reduced or eliminated by hermetic or non-hermetic sealing of the enclosure. For a hermetic seal, no air or water vapor is exchanged between the inside and the outside of enclosure. Some types of drives, such as helium-filled drives, use hermetic sealing. For a non-hermetic seal, air can exit or enter at a particular vent port. In order to prevent water vapor from entering, there may be a dehumidification feature at the port, e.g., heater, desiccant. The embodiments described herein may be used with hermetic or non-hermetic sealing.

On a hard drive described herein, a formed in place gasket (FIPG) is used to seal the cover with the base of the drive enclosure and thereby prevent moisture from entering via the cover/base interface. In some configurations, the bent edges of the cover overhang the edges of the base, sometimes referred to as a "bathtub cover." Tape can be applied around the edges of the bathtub cover to further seal the cover over the base. Due to space constraints, forming of the FIPG can challenging. Further, there is a concern that the FIPG will deflect sideways and not seal with the base. Therefore, drive enclosure features described herein will help ensure reliable sealing between the FIPG and the drive base.

In FIG. 1, a perspective view shows a hard drive 100 according to an example embodiment. The drive 100 generally includes at least one magnetic disk 102 that rotates around a spindle axis 110. The apparatus 100 further includes an arm 104 with an end-mounted a transducer head 106 that is positioned over a surface of the disk while reading from or writing to the disk 102. The arm 104 is driven by an actuator 108 to move radially across the disk 102. This movement of the arm 104 positions the transducer head 106 over on the disk 102 to read from or write to tracks on the disk 102. A hard drive of this type may include multiple arms 104 and disks 106 arranged in a stack formation, and may include read/write heads that read/write from/to both surfaces of the disks 102.

A cover 112 is placed over a base 114 of the drive 100 during final assembly. The cover 112 has a peripheral shape conforming to that of the base 114. The cover 112 has bent sides 112*a* that overlap corresponding sides 114*a* of the drive base 114. An inner surface of the cover 112 (see, e.g., inner surface 112*b* in FIG. 5) interfaces with a top, mating edge of the base 114. The cover 112 and base 114 form an enclosure for mechanical components of the drive 100. Other components, such as circuit boards, may be mounted outside the enclosure, such as a bottom surface (not shown) of the base 114.

Figure 2:
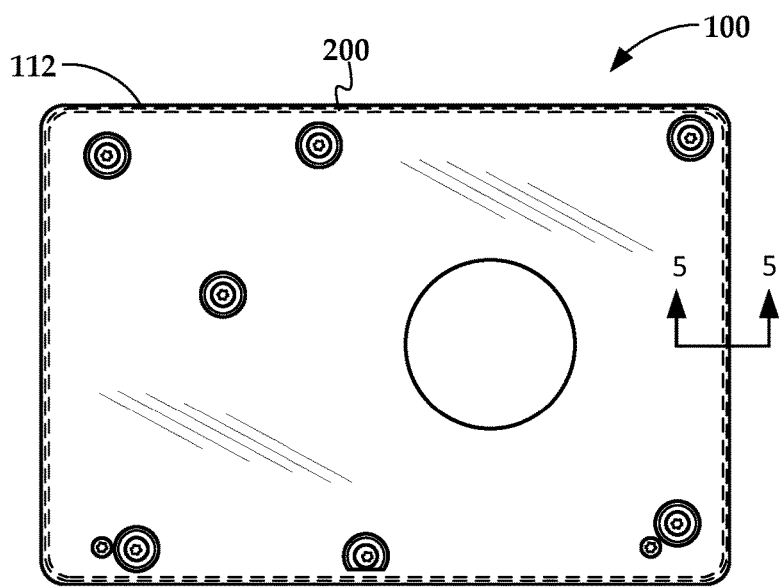
FIG. 2 is a top view of a drive according to an example embodiment.
Figure 3:
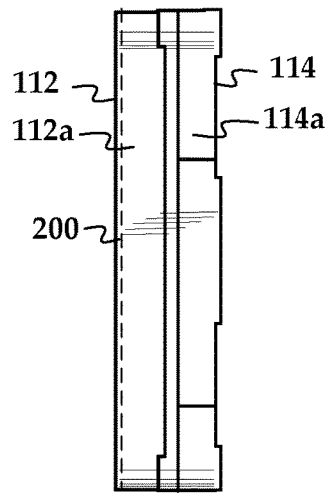
FIG. 3 is an end view of the drive of FIG. 2.
Figure 4:
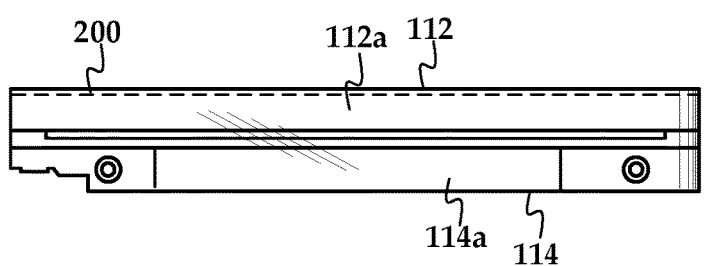
FIG. 4 is a side view of the drive of FIG. 2.
Figure 5:
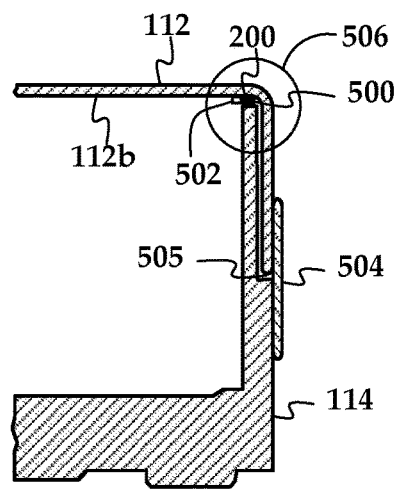
FIG. 5 is a cross-sectional view corresponding to section line 5-5 of FIG. 2.

The interface with the cover 112 and base 114 includes features that ensure that the cover 112 and base 114 are sealed when assembled and maintain the seal over the life of the drive 100. In FIGS. 2-4, respective top, end, and side views of the drive 100 show general placement of a sealing feature 200 according to an example embodiment. As best seen in FIG. 2, the sealing feature 200 encompasses a perimeter of the top cover 112 and the base 114. In FIG. 5, a cross-sectional view shows details of the drive 100 corresponding to section line 5-5 shown in FIG. 2.

Figure 6:
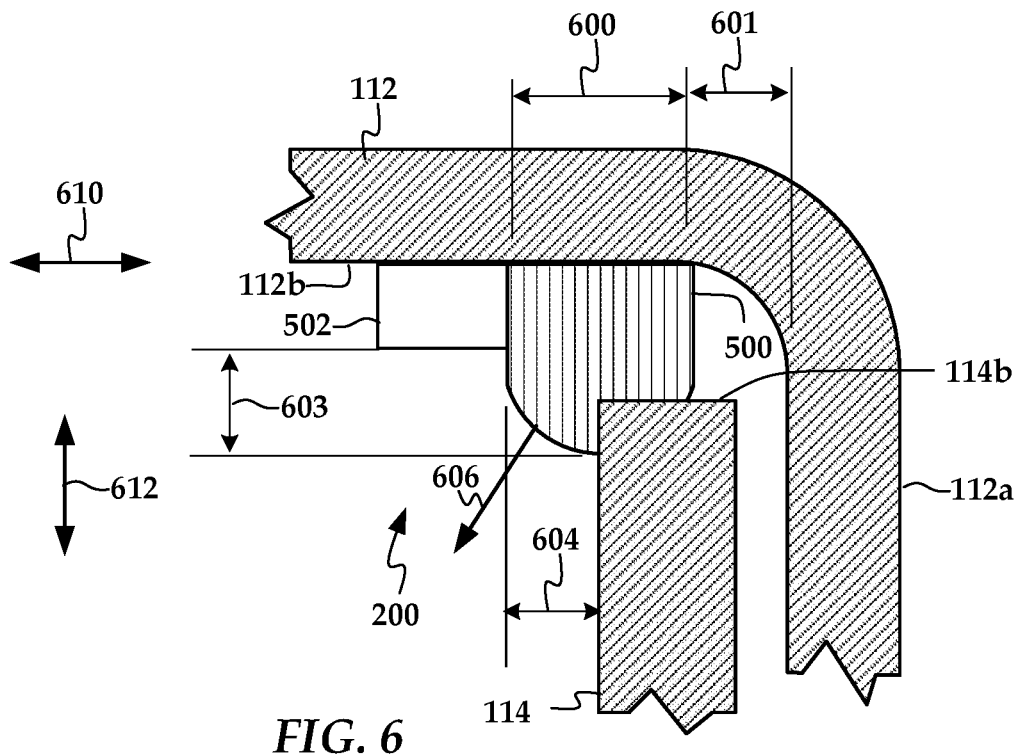
FIG. 6 is a cross-sectional view of a sealing feature according to an example embodiment.

As seen in FIG. 5, the sealing feature includes a FIPG 500 and a stop member 502. The FIPG 500 has a shape that corresponds to a top, mating edge of the base 114 (see, e.g., mating edge 114b in FIG. 6). Also seen in FIG. 5 is a sealer 504 for the outside gap 505 between the cover 512 and base. The sealer 504 may be tape, heat shrink, bonding material, etc. Circle 506 indicates a close-up view region that is shown in the cross-sectional views of the cover 112 and stop features 200 in FIG. 6. In FIG. 6, the FIPG 500 has a minimum width, e.g., 0.6 mm. A keep-out zone dimension 601 is defined so as allow sufficient clearance for a plotting needle that forms the FIPG 500 by injecting gasket material that bonds with the cover. For example, the keep-out zone dimension 601 may be 0.20 to 0.25 mm. The stop member 502 is lower than the FIPG 500 by dimension 603, and therefore a keep-out zone may not be needed on this side of the FIPG 500, allowing the stop member 502 to be near or in contact with the FIPG 500.

Due to manufacturing tolerances, the FIPG 500 may be misaligned from the edge of the base 114 by a distance 604. Without the stopping member 502, such an offset may allow the FIPG 500 to deflect in a direction indicated by arrow 606. The horizontal component of such a deflection 606 could result in a loss of sealing of the cover 112 with the base 114. The stop member 502 provides stiffness to the FIPG 500 in a horizontal direction 610, wherein "horizontal" refers to a direction normal to side 112a. The cover is installed in a vertical direction 612 in such a case, the vertical direction 612 being normal to the inner surface 112b. The FIPG 500 extends a greater distance 603 away from the inner surface 112a further than the stop member 502. This greater distance 603 is selected to allow the FIPG 500 to compress by the desired amount without the stop member 502 interfering with the mating edge 114a of the base.

Figure 7:
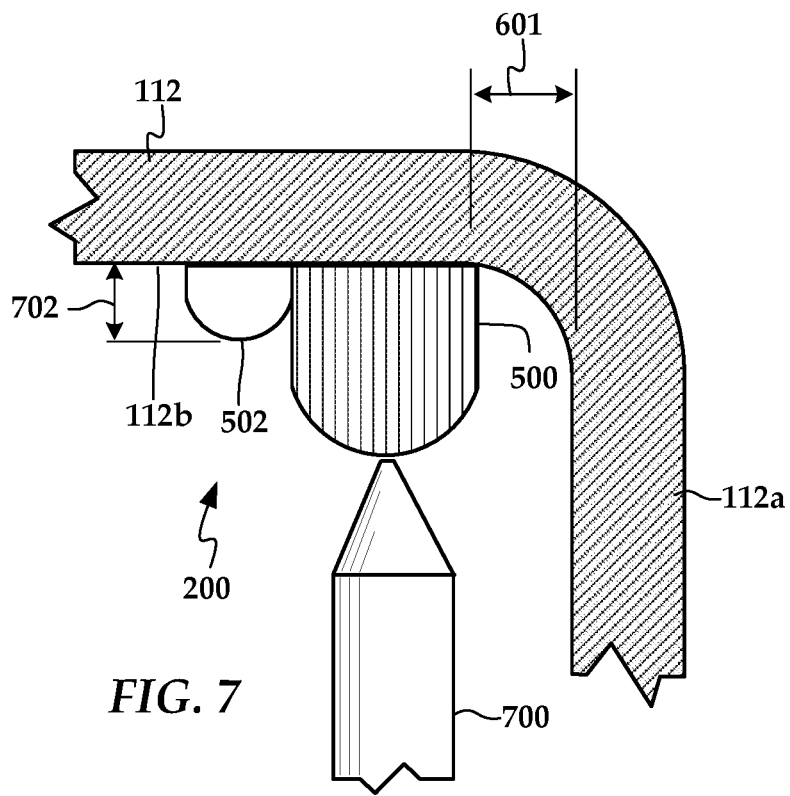
FIG. 7 is a cross-sectional view of a sealing feature according to another example embodiment.

In FIG. 7, a diagram shows the formation of the FIPG 500 on the cover 112 according to an example embodiment. A plotting needle 700 moves near the cover surface 112b along a path that corresponds to the shape of the mating surface 114b of the base. In this example, the stop member 502 is shown with a different shape than what is shown in FIG. 6 (rounded versus rectangular) and may be in place before the FIPG 500 is formed. As noted above, the location of the FIPG 500 is defined so that a sufficient clearance 601 is provided between the plotting needle 700 and the side 112a of the cover. Also, the height 702 of stop member 502 (which is defined relative to the height of the FIPG 500 by distance 603 in FIG. 6) is such that it does not interfere with the plotting needle 700.

Figure 8:
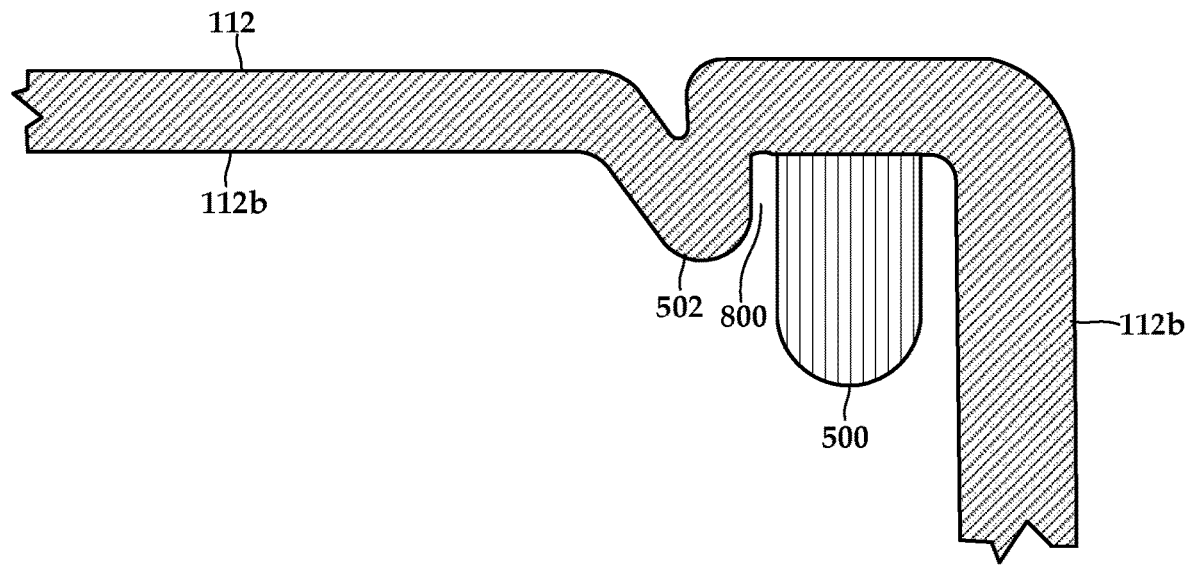
FIG. 8 is a cross-sectional view of a stop member according to an example embodiment.

The stop member 502 may be formed integrally with the cover 112, e.g., of the same material as the cover and during manufacture of the cover or in a post-manufacture process. For example, a micro-welded bead may be added after stamping of the cover 112, or some other additive process may be used, e.g., 3-D printing. In FIG. 8, a cross sectional view shows an integral stop member 502 according to an example embodiment. The stop member 502 is formed by coining a ridge or similar feature into the surface 112b of the cover 112. Generally, coining involves stamping at a high pressure to induce plastic flow of the material into precision mold features, e.g., as used in the manufacture of coining. In this example, a gap 800 is shown between the coined ridge 502 and the FIPG 500. This gap 800 may result from manufacturing tolerances or may be included by design. Generally, the gap 800 is small enough so that the stop member 502 will prevent a predetermined amount of horizontal deflection of the FIPG 500 in the event of misalignment between the FIPG and the mating edge 114b of the base 114.

In other embodiments, the stop member 502 may be made from a different material than the cover 112, and may be made of a material with a stiffness equal to or greater than that of the FIPG 500. For example, as seen in FIG. 7, the FIPG 500 may be made using a similar process to the FIPG 500 (using a plotting needle) but depositing a harder material at different dimensions. The hardness of the material 500 may be set as the material dries and/or may be controlled via heat treating or other treatments (e.g., ultraviolet light). The stop member 502 may be formed before or after the FIPG 500.

Figure 9:
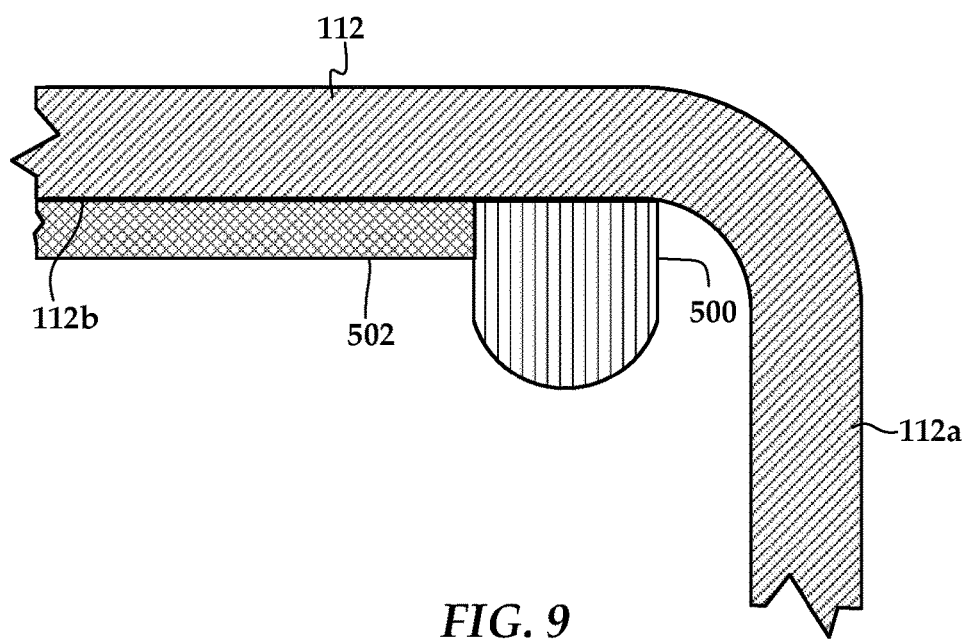
FIG. 9 is a cross-sectional view of a stop member according to another example embodiment.

In FIG. 9, a diagram shows a configuration of a stop member 502 according to another example embodiment. In this case, the stop member 502 includes a material layer that extends along the entire inner surface 112b of the cover 112. This layer may be formed to the desired shape (e.g., via laser cutting) and attached to the surface 112b via a bonding material. In other embodiments, the FIPG 500 may first be formed, and the material deposited in a liquid form inside the inner perimeter of the FIPG 500 and allowed to harden. While a larger stop member 502 requires more material, it may have other advantages, e.g., damping of the drive enclosure and/or noise reduction.

Figure 10:
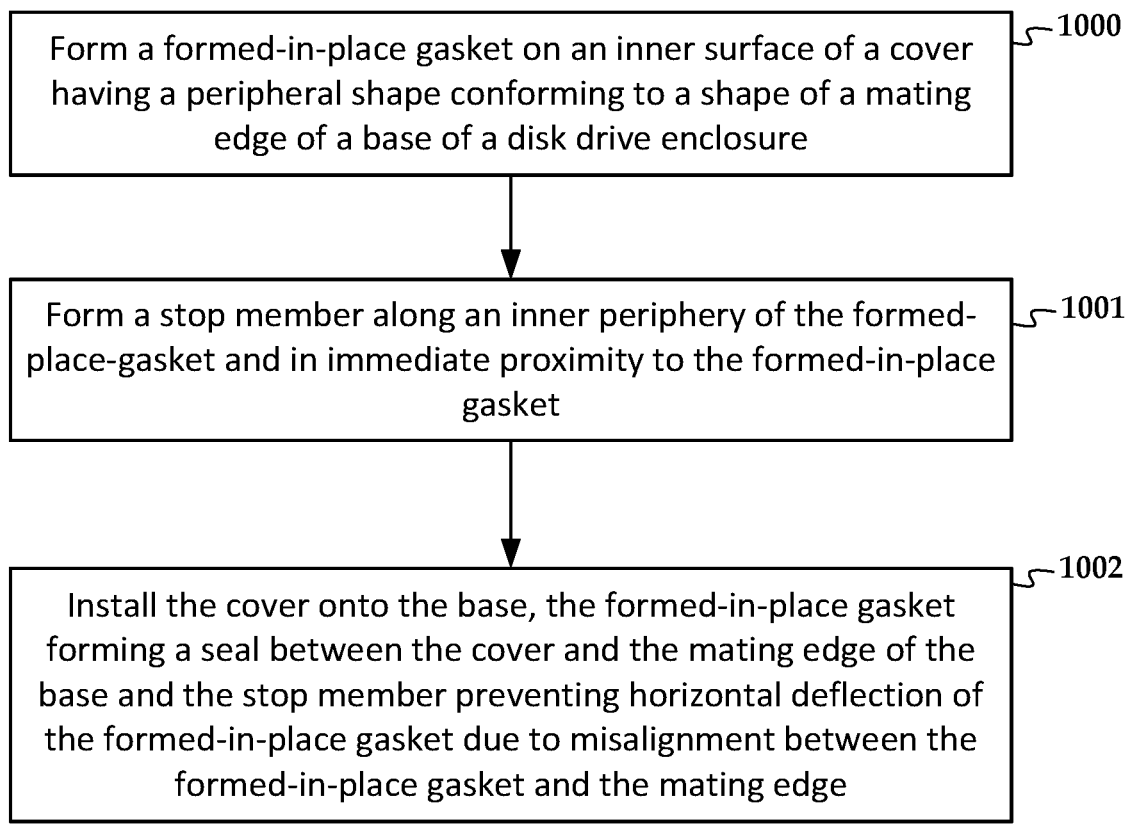
FIG. 10 is a flowchart of a method according to example embodiments.

In reference now to FIG. 10, a flowchart illustrates a method according to an example embodiment. The method involves forming 1000 a formed-in-place gasket on an inner surface of a cover. The cover has a peripheral shape conforming to a base of a disk drive enclosure. The formed-in-place gasket has a peripheral shape conforming to a shape of a mating edge of the base. A stop member is formed 1001 along an inner periphery of the formed-place-gasket and in immediate proximity to the formed-in-place gasket. The cover is installed 1002 onto the base. The formed-in-place gasket forms a seal between the cover and the mating edge of the base and the stop member and prevents horizontal deflection of the formed-in-place gasket due to misalignment between the formed-in-place gasket and the mating edge. It will be understood that the stop member may be formed 1001 using a number of different processes and structures, and that the formation 1001 of the stop member may occur before or after the formation 1000 of the gasket.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A disk drive enclosure, comprising:
a cover having a peripheral shape conforming to that of a base of the disk drive enclosure;
a formed-in-place gasket extending from an inner surface of the cover and corresponding to a shape of a mating edge of the base, the formed-in-place gasket forming a seal between the cover and the mating edge of the base; and
a stop member extending from the inner surface of the cover along an inner periphery of the formed-in-place-gasket and in immediate proximity to an exposed side of the formed-in-place gasket, a region of the inner surface of the cover from which the formed-in-place gasket and the stop member extend being planar, the formed-in-place gasket extending further away from the inner surface than the stop member, the stop member preventing a horizontal deformation of the exposed side of the formed-in-place gasket if there is a misalignment between the formed-in-place gasket and the mating edge when the cover is installed on the base.

2. The disk drive enclosure of claim 1, wherein the cover further comprises bent edges along the outer periphery, the bent edges extending over edges of the base when the cover is installed over the base.

3. The disk drive enclosure of claim 1, wherein the stop member comprises a ridge formed of a same material as the cover.

4. The disk drive enclosure of claim 3, wherein the ridge comprises a coined ridge.

5. The disk drive enclosure of claim 3, wherein the ridge is formed via an additive process.

6. The disk drive enclosure of claim 1, wherein the stop member is formed of a different material than the cover.

7. The disk drive enclosure of claim 1, wherein the formed-in-place gasket extending further away from the inner surface than the stop member prevents interference between the stop member and the mating edge of the base when the cover is installed on the base.

8. The disk drive enclosure of claim 1, wherein the formed-in-place gasket extending further away from the inner surface than the stop member prevents interference between the stop member and a plotting needle used to form the formed-in-place gasket.

9. The disk drive enclosure of claim 1, wherein the stop member is in contact with the formed-in-place gasket.

10. The disk drive enclosure of claim 1, wherein the mating edge comprises a rectangular edge that is no wider than the formed-in-place gasket.

11. The disk drive enclosure of claim 1, wherein the stop member provides stiffness to the formed-in-place gasket in a horizontal direction normal to the inner surface.

12. A method comprising:
forming a formed-in-place gasket on an inner surface of a cover having a peripheral shape conforming to a base of a disk drive enclosure, the formed-in-place gasket corresponding to a shape of a mating edge of the base;
after forming the formed-in-place gasket, forming a stop member along an inner periphery of the formed-place-gasket and in immediate proximity to the formed-in-place gasket; and
installing the cover onto the base, the formed-in-place gasket forming a seal between the cover and the mating edge of the base and the stop member preventing horizontal deflection of the formed-in-place gasket due to misalignment between the formed-in-place gasket and the mating edge.

13. The method of claim 12, wherein forming the stop member comprises using an additive process.

14. The method of claim 12, wherein the stop member is formed of a different material than the cover.

15. An apparatus comprising:
a disk drive enclosure comprising a base and a cover having a peripheral shape conforming to that of the base;
a magnetic disk, arm, and head mounted in the base;
a formed-in-place gasket extending from an inner surface of the cover and corresponding to a shape of a mating edge of the base, the formed-in-place gasket forming a seal between the cover and the mating edge of the base when the cover is installed on the base, the seal preventing moisture from entering the disk drive enclosure; and
a stop member extending from the inner surface of the cover along an inner periphery of the formed-place-gasket and in immediate proximity to an exposed side of the formed-in-place gasket, a region of the inner surface of the cover from which the formed-in-place gasket and the stop member extend being planar, the formed-in place gasket extending further away from the inner surface than the stop member, the stop member preventing a horizontal deformation of the exposed side of the formed-in-place gasket due to misalignment between the formed-in-place gasket and the mating edge when the cover is installed on the base.

16. The apparatus of claim 15, wherein the stop member comprises a coined ridge.

17. The apparatus of claim 15, wherein the mating edge comprises a rectangular edge that is no wider than the formed-in-place gasket.

18. The apparatus of claim 15, wherein the stop member provides stiffness to the formed-in-place gasket in a horizontal direction normal to the inner surface.

* * * * *